United States Patent
Toda et al.

(10) Patent No.: US 6,883,236 B2
(45) Date of Patent: Apr. 26, 2005

(54) VEHICLE-USE BEARING APPARATUS

(75) Inventors: Kazutoshi Toda, Osaka (JP); Naoki Morimura, Kashiba (JP); Tadashi Mitarai, Osaka (JP); Daisaku Tomita, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/613,710

(22) Filed: Jul. 3, 2003

(65) Prior Publication Data

US 2004/0096133 A1 May 20, 2004

Related U.S. Application Data

(63) Continuation of application No. 10/057,051, filed on Oct. 26, 2001, now abandoned.

(30) Foreign Application Priority Data

Oct. 27, 2000 (JP) .................................... P2000-328730

(51) Int. Cl.[7] .............................................. F16C 33/58
(52) U.S. Cl. ..................... 29/898.09; 384/544; 384/571
(58) Field of Search ................................. 384/571, 589, 384/544; 29/898.09, 898.07

(56) References Cited

FOREIGN PATENT DOCUMENTS

JP          11097510         * 10/2000

* cited by examiner

Primary Examiner—William C. Joyce
Assistant Examiner—Julie K. Smith
(74) Attorney, Agent, or Firm—Jordan and Hamburg LLP

(57) ABSTRACT

A double row tapered roller bearing with vertex of contact angles outside of the bearing is externally fitted to an outer periphery of a hub wheel to which a wheel is attached. A shaft end of the hub wheel is deformed outwardly in a radial direction so as to be caulked to an outer end surface of an inner ring of the bearing. A raceway track of at least one of the inner ring and the outer ring in the bearing is designed so as to satisfy a condition that a predetermined form is secured in a state that the raceway track is elastically deformed by the caulking. As a result, satisfactory rolling performance of the tapered roller after the caulking is secured, and a predetermined life of the bearing apparatus after the caulking can be obtained.

11 Claims, 6 Drawing Sheets

F I G. 3
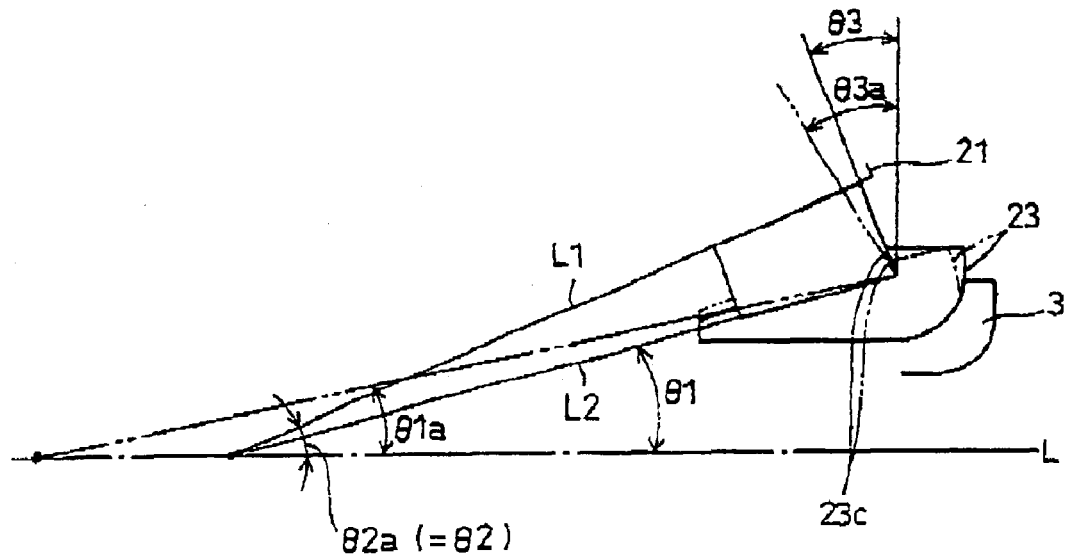
F I G. 4
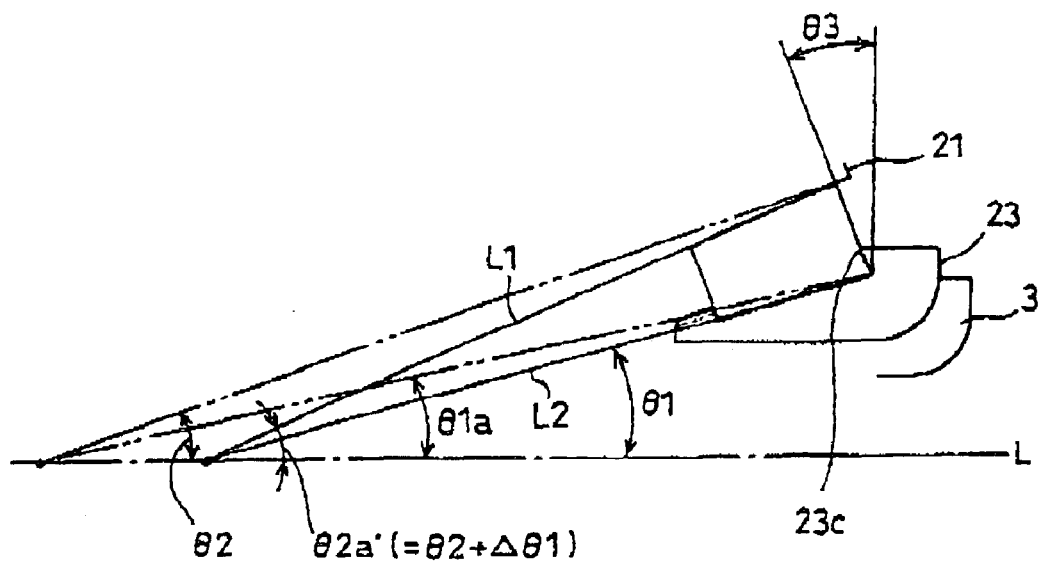

VEHICLE-USE BEARING APPARATUS

This is a Continuation of application Ser. No. 10/057,051 filed Oct. 26, 2001, now abandoned.

BACKGROUND OF THE INVENTION

The present invention relates to a vehicle-use bearing apparatus of a disk rotor in a disk brake apparatus, a hub unit to which wheels are attached, and the like. Particularly the invention relates to the vehicle-use bearing apparatus having a double row tapered roller bearing with vertex of contact angles outside of bearing.

A double row tapered roller bearing with vertex of contact angles outside of the bearing is generally used to receive large radial load, axial load and moment load which are applied from a vehicle body of large weight.

In a vehicle-use bearing apparatus having such a bearing, the bearing is externally fitted to an outer periphery of a hub wheel to which wheels are attached, and a shaft portion end of the hub wheel is deformed outwardly in a radial direction so as to be caulked to an outer end surface of one inner ring of the bearing.

In order to maintain rolling performance on rolling contact surfaces of inner and outer rings of the tapered roller, as shown in FIG. 7 which is an enlarged diagram of a main section on the caulked side of the bearing, the bearing is designed so that extended lines along rolling contact surfaces 23a and 21a of the inner ring 23 and the outer ring 21 with respect to a rotational axis L of a shaft portion of the hub wheel and an extended line along an outer peripheral surface of the tapered roller 22 meet at one point Q on the rotational axis L of the hub wheel.

In this case, θ1 is an angle of a raceway track of the inner ring 23 with respect to the rotational axis L, θ2 is an angle of a raceway track of the outer ring 21 with respect to the rotational axis L, and θ3 is an angle of an inner wall surface 23c of a cone back face rib 23b which is expanded outwardly in the radial direction on a large diameter side of the inner ring 23. The numeral 3 designates a section which is caulked by the shaft end of the hub wheel.

As to the angles of the raceway tracks θ1 and θ2 and the angle of the inner wall surface θ3, the same design is applied to the other inner ring and outer ring, not shown, and these angles correspond to the angles of the raceway tracks of the other inner and outer rings and the angle of the inner wall surface of the cone back face rib.

In the prior art, when the shaft end of the hub wheel is bent and deformed outwardly in the radial direction so as to be caulked to the outer end surface of the inner ring 23, since the rolling contact surfaces 23a and 21a of the inner and outer rings and the cone back face rib 23b are elastically deformed, the angles of the raceway tracks θ1 and θ2 and the angle of the inner wall surface 23c, θ3, which are regulated to originally required angles are occasionally changed.

In this case, a contact state of the tapered roller with the rolling contact surfaces and the inner wall surface becomes unstable, namely, a life of the bearing apparatus is influenced.

SUMMARY OF THE INVENTION

Therefore, it is a main object of the present invention to provide a vehicle-use bearing apparatus in which, after a shaft end of a hub wheel is caulked, forms of raceway tracks of inner and outer rings are optimized and a life of a bearing can be improved.

Other objects, characteristics and advantages of the present invention will become clear by the following description.

Briefly stated, the present invention includes: a hub wheel to which a wheel is attached; and a double row tapered roller bearing with vertex of contact angles outside of the bearing to be attached to an outer periphery of said hub wheel, designed so that a shaft end of the hub wheel is deformed outwardly in a radial direction so as to be caulked to an outer end surface of an inner ring of the tapered roller bearing, and the tapered roller bearing has an inner ring and an outer ring whose rolling contact surfaces are tapered and a tapered roller which is arranged between the rolling contact surface of the inner ring and the rolling contact surface of the outer ring, and a form of a raceway track of at least one of the inner and outer rings is designed so as to satisfy a condition that a predetermined form is secured in a state that the raceway track is elastically deformed by the caulking.

In this design, even if the shaft end of the hub wheel is bent and deformed outwardly in the radial direction to the outer end surface of the inner ring so as to be caulked, an angle of the raceway tracks of the inner and outer rings after caulking, for example, an angle of the rolling contact surfaces of the inner and outer rings can be set to a prescribed angle which is originally required. As a result, in accordance with this design, satisfactory rolling performance of the tapered roller can be secured, and these raceway tracks and raceway tracks of the other inner and outer rings can be balanced. A predetermined life of the bearing apparatus after the caulking can therefore be obtained.

Preferably in accordance with embodiment of the present invention, the condition is such that the form of the raceway track of at least one of the inner and outer rings before caulking is set so that an extended line along one of the rolling contact surface and an extended line along an outer peripheral surface of the tapered roller meet at a rotational axis of the hub wheel after the caulking.

Preferably in accordance with a further embodiment of the present invention, the condition is such that the forms of the raceway tracks of the inner and outer rings before the caulking are set so that extended lines along the rolling contact surfaces of the outer and inner rings and an extended line along an outer peripheral surface of the tapered roller meet at a rotational axis of the hub wheel.

In accordance with a further embodiment of the present invention, preferably the condition is such that an angle of the rolling contact surface of the inner ring before the caulking is set to an angle obtained by subtracting a fluctuation angle of the rolling contact surface due to the caulking from an angle of the rolling contact surface where the raceway track of the inner ring secures a required form.

In accordance with yet another embodiment, preferably the condition is such that an angle of the rolling contact surface of the outer ring before the caulking is set to an angle obtained by adding a fluctuation angle of the rolling contact surface of the inner ring due to the caulking to an angle of the rolling contact surface where the raceway track of the outer ring secures a required form.

These and other objects, as well as advantages of the invention, will become clear by the following description of preferred embodiments of the invention with reference to the accompanying drawings.

BRIEF DESCRIPTION OF THE DRAWINGS

FIG. 3 is a function explanatory diagram of the vehicle-use bearing apparatus of FIG. 1;

FIG. 4 is an another function explanatory diagram of the vehicle-use bearing apparatus of FIG. 1;

DETAILED DESCRIPTION OF PREFERRED EMBODIMENTS

There will be explained below a vehicle-use bearing apparatus of the present invention which is applied to an automobile. This bearing apparatus is not limited to an automobile use, and can be applied similarly to other vehicles, such as a railway vehicle.

Figure 1:
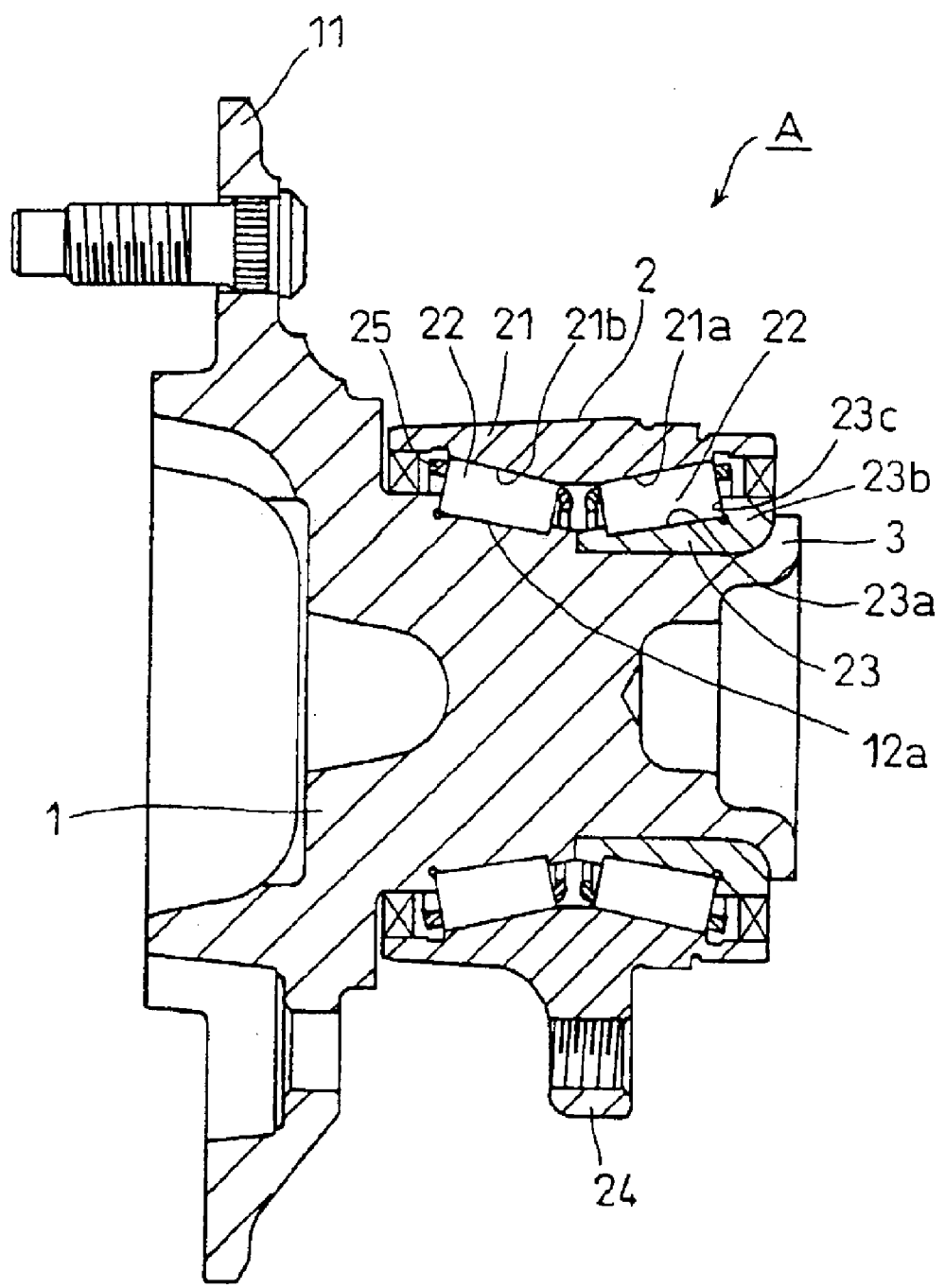
FIG. 1 is a side view of a longitudinal section of a vehicle-use bearing apparatus according to an embodiment of the present invention.
Figure 2:
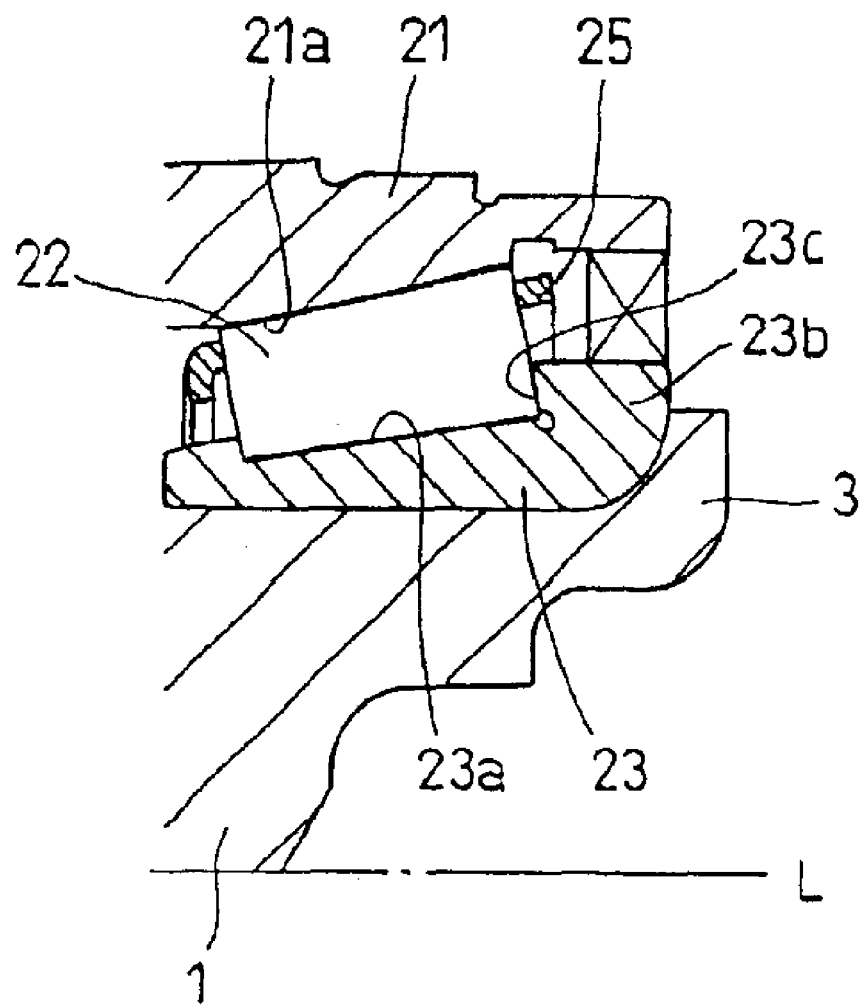
FIG. 2 is an enlarged diagram of a main section of FIG. 1.

With reference to FIGS. 1 through 3, a symbol A shows a whole vehicle-use bearing apparatus which is used on a driven wheel of an automobile.

A hub wheel 1 has an annular flange 11 which faces outwardly in a radial direction, to which a wheel, not shown, is attached, on a vehicle outer side. A double row tapered roller bearing with vertex of contact angles outside of bearing 2 is externally fitted to an outer periphery of a vehicle inner side of the hub wheel 1.

This bearing 2 includes a single outer ring 21 having two-row rolling contact surfaces 21a and 21b adjacent to each other in an axial direction, a plurality of tapered rollers 22 which are arranged on the two-row rolling contact surfaces 21a and 21b, and an inner ring 23 which has a single rolling contact surface 23a which is paired with the rolling contact surface 21a on the vehicle inner side of the outer ring 21 and is fitted to an outer peripheral surface of the hub wheel 1. Moreover, the bearing 2 is constituted so that a required area of the outer peripheral surface of the hub wheel 1 is utilized as a rolling contact surface 12a which is paired with the rolling contact surface 21b on the vehicle outer side of the outer ring 21. The numeral 25 designates a cage.

The rolling contact surface 21a on the vehicle inner side of the outer ring 21 is tapered such that its diameter is larger towards a shaft end of the vehicle inner side of the hub wheel 1. The rolling contact surface 21b of the vehicle outer side is tapered such that its diameter is larger towards a shaft end of the vehicle outer side of the hub wheel 1.

The rolling contact surface 23a of the inner ring 23 is tapered such that its diameter is larger towards the shaft end of the vehicle inner side of the hub wheel 1. A cone back face rib 23b which is expanded outwardly in the radial direction is formed on the large diameter side of the tapered rolling contact surface 23a.

A raceway track of the inner ring 23 is composed of the tapered rolling contact surface 23a and an inner wall surface 23c of the cone back face rib 23b.

The vehicle inner side of the hub wheel 1 has a hollow form, and the shaft end of the vehicle inner side is bent outwardly in the radial direction and is caulked to an outer end surface of the inner ring 23 of the bearing 2 so as to be a caulked portion 3.

A radially outward flange 24 is provided on an outer periphery of the outer ring 21. The outer ring 21 is mounted to an axle case or the like, not shown, via the flange 24 so as to be non-rotatable.

The raceway tracks of the inner ring 23 and the outer ring 21 in the bearing 2 are designed so as to satisfy a condition which secures a predetermined form in a state that the raceway tracks are elastically deformed by caulking.

This design approach will be explained below with reference to FIG. 3. FIG. 3 shows an exaggerated state to simplify understanding.

Briefly stated, the inner ring 23, the outer ring 21 and the inner wall surface 23c are designed so that the raceway tracks of the inner ring 23, the outer ring 21 and the inner wall surface 23c of the cone back face rib 23b have predetermined forms before caulking (forms shown by virtual lines) which are different from the forms shown by continuous lines in order to allow elastic deformation due to caulking for the originally required forms (forms shown by the continuous lines).

In order to obtain this design form, a change amount according to a caulking load for each dimension of the vehicle-use bearing apparatus is checked by experiment, and the design is obtained experimentally so as to be set.

The details will be explained below. Firstly $\theta 1a$, $\theta 2a$ and $\theta 3a$ are angles of the shaft end of the hub wheel 1 before caulking, and the raceway tracks of the inner ring 23 and the outer ring 21 are designed so as to obtain forms based on these angles before caulking.

In addition, $\theta 1$, $\theta 2$ and $\theta 3$ are angles after caulking, and angles which obtain the originally required forms of the raceway tracks of the inner ring 23 and the outer ring 21.

Here, $\theta 1a$ and $\theta 1$ are angles of the rolling contact surface of the inner ring 23 with respect to a rotational axis L of the hub wheel 1, $\theta 2a$ and $\theta 2$ are angles of the rolling contact surface of the outer ring 21 with respect to the rotational axis L of the hub wheel 1, and $\theta 3a$ and $\theta 3$ are tilt angles of the inner wall surface 23c of the cone back face rib 23b with respect to the radial direction.

As a result of the experiment, the angle of the rolling contact surface of the inner ring 23 before caulking becomes larger after caulking, namely, it is changed from $\theta 1a$ to $\theta 1$, and the angle of the rolling contact surface of the outer ring 21 before caulking does not change after caulking ($\theta 2a=\theta 2$).

The tilt angle of the inner wall surface 23c of the cone back face rib 23 before caulking becomes smaller after caulking, namely, it is changed from $\theta 3a$ to $\theta 3$.

The tilt angle of the inner wall surface 23c of the cone back face rib 23 becomes smaller due to caulking, namely, it is changed from $\theta 3a$ to $\theta 3$ because the angle of the rolling contact surface of the inner ring 23, $\theta 1a$, before caulking becomes larger due to caulking and becomes $\theta 1$ after caulking, and the angle of the rolling contact surface of the outer ring 21, $\theta 2a$ does not change before and after caulking and thus the tapered rollers 22 pushes the cone back face rib 23 due to a wedge effect.

Fluctuating angles of the inner ring 23, the outer ring 21 and the inner wall surface 23c which fluctuate due to a caulking load with respect to the outer end surface of the inner ring 23 due to caulking are $\Delta\theta 1$, $\Delta\theta 2$ and $\Delta\theta 3$.

The angle of the rolling contact surface of the inner ring 23 before caulking $\theta 1a$ is set to an angle $\theta 1a$ ($=\theta 1-\Delta\theta 1$) obtained by subtracting a fluctuation angle of the rolling contact surface $\Delta\theta 1$ from the angle of the rolling contact surface $\theta 1$ where the raceway track of the inner ring 23 secures the originally required form.

The tilt angle $\theta3a$ of the inner wall surface $23c$ of the cone back face rib 23 before caulking is set to an angle $\theta3a$ (=$\theta3$+$\Delta\theta3$) obtained by adding a fluctuation tilt angle $\Delta\theta3$ due to caulking to the tilt angle $\theta3$ where the inner wall surface $23c$ secures the originally required form.

With the above settings, the angle of the rolling contact surface of the inner ring 23 is changed from $\theta1a$ before caulking into $\theta1$ after caulking, and the tilt angle of the inner wall surface $23c$ is changed from $\theta3a$ before caulking into $\theta3$ after caulking.

As a result, as shown in FIG. 3, after caulking, extended lines L1 and L2 along the rolling contact surfaces of the inner ring 23 and the outer ring 21 and an extended line along the outer peripheral surface of the tapered rollers 22 with respect to the rotational axis L of the hub wheel 1 meet at one point Q on the rotational axis L. The forms of the rolling contact surfaces of the inner ring 23 and the outer ring 21 and the inner wall surface $23c$ are optimized, and their contact states with the tapered rollers 22 become stable so that the life of the bearing is improved.

In the case of the above embodiment, elastic deformation due to caulking is allowed for the originally required forms (forms shown by continuous lines) of the angle of the rolling contact surface, $\theta1a$, of the inner ring 23 and the tilt angle $\theta3a$ of the inner wall surface $23c$, and thus the angle of the rolling contact surface, $\theta1a$, of the inner ring 23 and the tilt angle $\theta3a$ of the inner wall surface $23c$ are designed so as to have predetermined forms (shown by virtual lines) different from the forms shown by continuous lines before caulking. However, the raceway track of the outer ring 21 can be designed in such a manner.

In the case where the raceway track of the outer ring 21 is so designed, as shown in FIG. 4, the angle of the rolling contact surface of the inner ring 23 is fixed to $\theta1$, and the angle of the rolling contact surface of the outer ring 21 is intentionally set to an angle $\theta2a'$ (=$\theta2$+$\Delta\theta1$) obtained by adding a fluctuation angle of the rolling contact surface of the inner ring 23, $\Delta\theta1$, to the angle of the rolling contact surface, $\theta2$, where the raceway track of the outer ring 21 secures the originally required form. As a result, deformation due to the angle of the rolling contact surface of the inner ring 23 can be absorbed by the side of the outer ring 21.

In addition, since $\Delta\theta3$ is obtained because $\theta2a$=$\theta2$ due to $\Delta\theta1$, $\Delta\theta3$=0 due to $\theta2a'$.

Further, the above design can be applied to the forms of the raceway tracks of both the inner ring 23 and the outer ring 21. In this case, a fluctuation angle of the rolling contact surface of the inner ring 23, $\Delta\theta1$, due to caulking is allocated to the angles of the rolling contact surfaces of the inner ring 23 and the outer ring 21.

Here, in the above embodiment, one of the two inner rings in the tapered roller bearing 2 is the inner ring 23 itself, but as for the other inner ring, the required area of the outer peripheral surface of the hub wheel 1 is utilized as the rolling contact surface $12a$ which is pared with the rolling contact surface $21a$ on the vehicle outer side of the outer ring 21.

Figure 5:
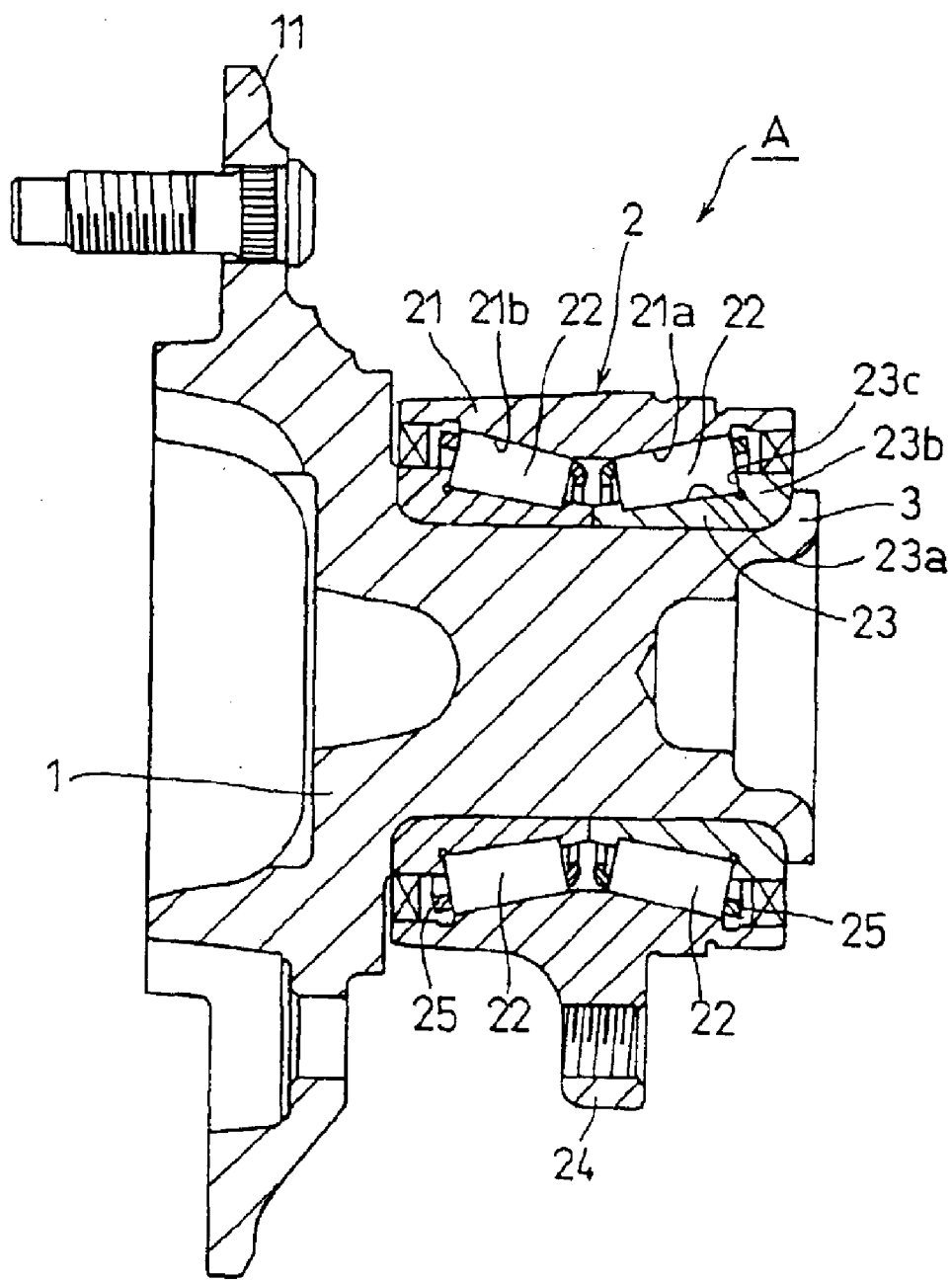
FIG. 5 is a side diagram of a longitudinal section of the vehicle-use bearing apparatus according to another embodiment of the present invention.

Alternatively, the present invention can be applied to a structure that both the inner rings 23 in the tapered roller bearing 2 shown in FIG. 5 are provided to the vehicle outer side and the vehicle inner side.

Namely, also in the case of the vehicle-use bearing apparatus of FIG. 5, the raceway track of at least one of the outer ring 21 and the vehicle inner side inner ring 23 in the tapered bearing 2 is desired so as to satisfy a condition that a predetermined form is secured in a state that the raceway track is elastically deformed by the caulking. This condition can be also determined similarly to the embodiments in FIGS. 1 through 3.

Figure 6:
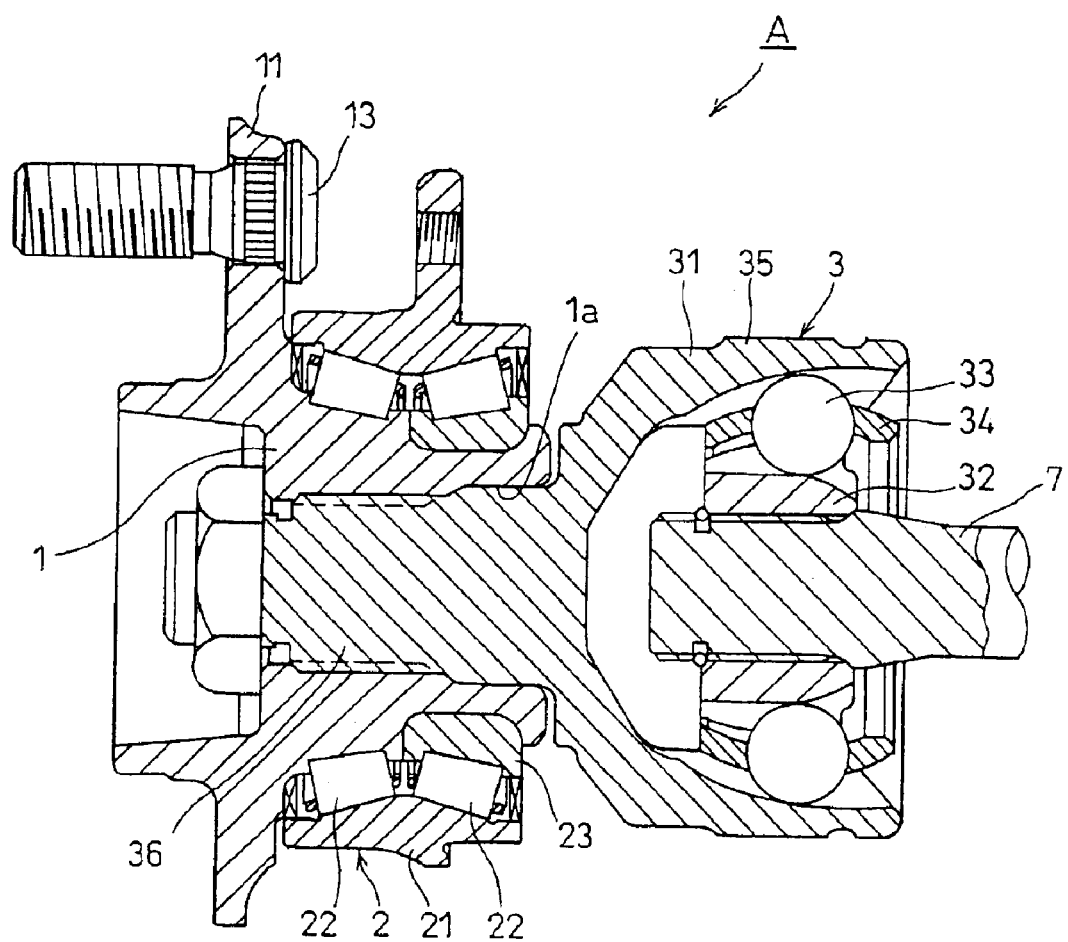
FIG. 6 is a side view of a longitudinal section of the vehicle-use bearing apparatus according to still another embodiment of the present invention.
Figure 7:
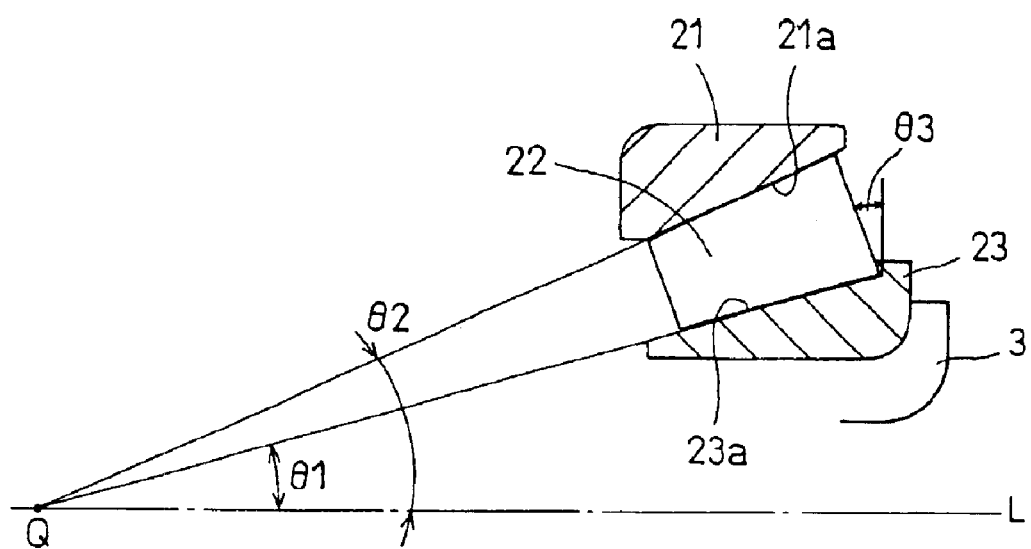
FIG. 7 is an enlarged cross section of a main section of a prior vehicle-use bearing apparatus.

Here, the vehicle-use bearing apparatus in the above embodiment is on the driven wheel side of the vehicle, but may be on the driving wheel side as shown in FIG. 6.

The vehicle-use bearing apparatus shown in FIG. 6 has an equal velocity joint 3 in addition to the hub wheel 1 and the double row tapered roller bearing with vertex of contact angles outside of bearing 2.

The hub wheel 1 has a center hole $1a$.

The equal velocity joint 3 is called, for example, as a well-know Zeppa type (bar field type) equal velocity joint, and it is composed of an outer ring 31, an inner ring 32, a ball 33, a cage 34 and the like.

The outer ring 31 is composed of a bowl type drum section 35 which houses the inner ring 32, ball 33, the cage 34 and the like, and a shaft section 36 which is connected integrally with a small diameter side of the bowl type drum section 35.

One end of a shaft 7 (driving shaft) is spline-fitted into the inner ring 32 and is fixed by a retaining ring (symbol not shown) so as not to slip off, and the other end of the shaft 7 is attached to a vehicle differential device via another equal velocity joint, not shown.

The double row tapered roller bearing with vertex of contact angles outside of bearing 2 is attached to the outer peripheral surface of the hub wheel 1, and the equal velocity joint 3 is attached to the center hole $1a$ of the hub wheel 1 so as to be rotatable integrally with the hub wheel 1 in a state that it is close to the double row tapered roller bearing with vertex of contact angles outside of bearing 2.

In addition, a bolt 13 for fixing a disc rotor and a wheel (not shown) of a disc brake apparatus is attached to some places on the circumference of the flange 11 in a penetrative state.

In such a vehicle-use hub unit, a rotational power of the shaft 7 is transmitted to the wheel (not shown) attached to the hub wheel 1 via the equal velocity joint 3.

Also in the case of the embodiment of FIG. 6, the double row tapered roller bearing with vertex of contact angles outside of bearing 2 is designed so as to satisfy a condition that a predetermined form is secured in a state that the raceway tracks of the inner ring 23 and the outer ring 21 are elastically deformed by caulking. The condition can be determined similarly to the embodiments in FIGS. 1 through 3.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A method of optimizing angular orientation of rolling contact surfaces in a bearing having an inner ring and an outer ring on which the rolling contact surfaces are respectively provided and tapered rollers received therebetween, the bearing being received to a shaft and held thereto by carrying out of a caulking operation in which an end of the shaft is deformed outwardly so as to be caulked to an outer end surface of the inner ring, the method comprising:

determining an angle of the rolling contact surface of the outer ring at which extended lines of the respective rolling contact surfaces of the inner and outer rings intersect at a common point at a rotational axis of the shaft prior to the caulking operation;

obtaining an adjusted angle for the rolling contact surface of the outer ring by adding a fluctuation angle of the rolling contact surface of said inner ring due to the caulking operation to the angle of the rolling contact surface of the outer ring; and orienting the rolling contact surface of the outer ring at the adjusted angle relative to the rotational axis prior to performing the caulking operation.

2. A method according to claim 1, further comprising experimentally determining the fluctuation angle according to a caulking load.

3. A method according to claim 1, wherein the caulking operation is applied to a double row tapered roller bearing in which the outer ring is a single outer ring having two row rolling contact surfaces adjacent in an axial direction, the tapered rollers being arranged on said two row rolling contact surfaces, and in which the inner ring has a single rolling contact surface paired with a rolling contact surface on a vehicle inner side of the outer ring, the roller bearing being attached to an outer periphery of a hub wheel to which a wheel is attached, a required area of the outer peripheral surface of said hub wheel being utilized as a rolling contact surface paired with the rolling contact surface on the vehicle outer side of said outer ring.

4. A method according to claim 3, further comprising attaching an equal velocity joint to a center hole of said hub wheel so as to be rotatable integrally with said hub wheel and located proximate to said tapered roller bearing.

5. A method according to claim 1, wherein the caulking operation is applied to a tapered roller bearing in which the outer ring is a single outer ring having two row rolling contact surfaces adjacent in an axial direction, the inner ring including a first inner ring on a vehicle inner side corresponding to the rolling contact surface of said outer ring on the vehicle inner side, and a second inner ring on a vehicle outer side corresponding to the rolling contact surface of said outer ring on the vehicle outer side, the tapered rollers being arranged between the rolling contact surfaces of said outer ring and the first and second inner rings.

6. A method of optimizing angular orientation of rolling contact surfaces in a bearing having an inner ring and an outer ring on which the rolling contact surfaces are respectively provided and tapered rollers received therebetween, the bearing being received to a shaft and held thereto by carrying out of a caulking operation in which an end of the shaft is deformed outwardly so as to be caulked to an outer end surface of the inner ring, the method comprising:

obtaining a fluctuation angle of the rolling contact surface of said inner ring as a difference between an angle of the rolling contact surface of the inner ring prior to the caulking and a modified angle of the rolling contact surface of the inner ring due to the caulking operation to the angle of the rolling contact surface of the outer ring;

determining a preliminary angle of the rolling contact surface of the outer ring at which respective extended lines of the rolling contact surfaces of the inner and outer rings prior to the caulking operation intersect at a common axial position along a rotational axis of the shaft, said respective extended lines having an included angle therebetween for appropriately accommodating the tapered rollers;

adding a fluctuation angle of the rolling contact surface of said inner ring due to the caulking operation to the preliminary angle of the rolling contact surface of the outer ring to obtain an adjusted angle; and orienting the rolling contact surface of the outer ring at the adjusted angle relative to the rotational axis prior to performing the caulking operation whereby, when the angle of the rolling contact surface of the inner ring prior to the caulking is changed to the modified angle due to the caulking operation, the fluctuation angle is compensated for in the adjusted angle of the contact surface of said outer ring by being set prior to the caulking operation.

7. A method according to claim 6, wherein said bearing is a tapered roller bearing in which the outer ring is a single outer ring having two row rolling contact surfaces adjacent in an axial direction, the inner ring including a first inner ring on a vehicle inner side corresponding to the rolling contact surface of said outer ring on the vehicle inner side, and a second inner ring on a vehicle outer side corresponding to the rolling contact surface of said outer ring on the vehicle outer side, the tapered rollers being arranged between the rolling contact surfaces of said outer ring and the first and second inner rings.

8. A method according to claim 7, wherein said first and second inner rings are at a same angle with respect to the rotational axis prior to the caulking operation, and respective angles of said two row rolling contact surfaces of the single outer ring are different from one another.

9. A method according to claim 7, wherein said first and second inner rings are of a substantially same configuration prior to the caulking operation.

10. A method of optimizing angular orientation of rolling contact surfaces in a bearing having an inner ring and an outer ring on which the rolling contact surfaces are respectively provided and tapered rollers received therebetween, the bearing being received to a shaft and held thereto by carrying out of a caulking operation in which an end of the shaft is deformed outwardly so as to be caulked to an outer end surface of the inner ring, the method comprising:

adjusting an angle of the rolling contact surface of said outer ring, prior to the caulking operation, based upon a predicted change in angular orientation of the roller contact surface of said inner ring due to the caulking operation, such that a desired form is maintained after said caulking operation; and carrying out said caulking operation.

11. A method according to claim 10, wherein, in accordance with said desired form, the respective rolling contact surfaces of the inner and outer rings intersect at a common point at a rotational axis of the shaft after said step of carrying out said caulking operation.

* * * * *